United States Patent
Wu et al.

(10) Patent No.: US 6,648,118 B1
(45) Date of Patent: Nov. 18, 2003

(54) CLUTCH DEVICE FOR AN ELECTRIC MOTOR-DRIVEN WHEELED VEHICLE

(75) Inventors: Chia-Lung Wu, Kaohsiung Hsien (TW); San-Chi Lee, Kaohsiung (TW)

(73) Assignee: Kwang Yang Motor Co., Ltd., Kaohsiung (TW)

( * ) Notice: Subject to any disclaimer, the term of this patent is extended or adjusted under 35 U.S.C. 154(b) by 0 days.

(21) Appl. No.: 10/187,913

(22) Filed: Jul. 1, 2002

(51) Int. Cl.[7] ................................................ F16D 11/10
(52) U.S. Cl. ...................... 192/69.9; 192/93 R
(58) Field of Search ............... 192/69.9, 93 R, 192/93 A

(56) References Cited

U.S. PATENT DOCUMENTS 2,252,670 A * 8/1941 Demarest et al. .......... 192/69.9
3,058,558 A * 10/1962 Hawk ......................... 192/69.9
3,872,955 A * 3/1975 McIntyre ..................... 192/69.9
4,951,792 A * 8/1990 Egawa ........................ 192/69.9

* cited by examiner

Primary Examiner—Richard M. Lorence
(74) Attorney, Agent, or Firm—Christensen O'Connor Johnson Kindness PLLC

(57) ABSTRACT

A clutch device for an electric motor-driven wheeled vehicle includes a clutch shaft coupled with an input shaft of a gearbox and having a spline segment. A tubular coupler includes a clutching segment with spline and non-spline regions on an inner surrounding wall surface, surrounds the spline segment, and is shiftable relative the spline segment between coupled and uncoupled position. A shifter member has a shifting end disposed in a surrounding recess formed in an outer surrounding wall surface of the coupler, and is externally operable to cause movement of the shifting end so as to shift the coupler between the coupled and uncoupled positions.

4 Claims, 7 Drawing Sheets

CLUTCH DEVICE FOR AN ELECTRIC MOTOR-DRIVEN WHEELED VEHICLE

BACKGROUND OF THE INVENTION

1. Field of the Invention

This invention relates to a clutch device for an electric motor-driven wheeled vehicle, more particularly to a clutch device with a cam segment and a cam follower to transmit a rotational force of an operating lever to drive a shifter member so as to move a tubular coupler relative to a clutch shaft between coupled and uncoupled positions.

2. Description of the Related Art

Referring to FIGS. 1 to 3, a conventional clutch device 35 is shown to be mounted between an electric motor 25 and a transmitting mechanism 27. The transmitting mechanism 27 includes a transmitting gear 28, bevel wheels 29, differential pinions 20, a differential casing 30, a pin 31, and two bearings 32. The bevel wheels 29 are mounted on two axles 33 which are received in a hollow cylindrical housing 34 disposed on a gearbox 23. The clutch device 35 includes a gear 36 which is received rotatably in the gearbox 23 by means of a bearing 40 and which meshes with a ratchet 26 on an output shaft of the motor 25. A clutch shaft 37 has an outer surrounding wall surface with first and second spline segments 371,372 and a smaller-diameter middle segment 373 therebetween, and an inner surrounding wall surface with an inner spline portion 374 that is in a spline engagement with an outer spline portion 381 of an axle shaft 38. The second spline segment 372 meshes with the transmitting gear 28. The axle shaft 38 is received rotatably in the gearbox 23 by means of a bearing 42. A biasing spring 39 is disposed between the first spline segment 371 of the clutch shaft 37 and an inner side of the gearbox 23. An operating lever 41 is disposed to pass through a cover plate 24 secured on the gearbox 23 to abut against the clutch shaft 37 at the second spline segment 372. The clutch shaft 37 passes through an axial hole in the gear 36. Thus, in a normal state, as shown in FIG. 2, the first spline segment 371 is in a spline engagement with an inner spline portion 361 in the axial hole, thereby transmitting a drive of the motor 25 to the transmitting mechanism 27 via the clutch device 35. As shown in FIG. 3, when the operating lever 41 is operated to move the clutch shaft 37 against the biasing action of the biasing spring 39 such that the middle segment 373 faces towards the inner spline portion 361, the clutch shaft 37 is disconnected from the gear 36.

Since the operating lever 41 is connected directly to the clutch shaft 37 to actuate movement of the latter, and since the biasing spring 39 is required to restore the clutch shaft 37 to its original position, a relatively large amount of force is required to operate the operating lever 41 against the biasing action of the biasing spring 39.

SUMMARY OF THE INVENTION

The object of the present invention is to provide a clutch device which can be conveniently and smoothly operated to shift between coupled and uncoupled positions.

According to this invention, the clutch device includes a mounting support which has front and rear ends opposite to each other along an axis, and an inner annular bearing wall that surrounds the axis and that extends between the front and rear ends. A clutch shaft includes a coupled segment and a first spline segment which are disposed opposite to each other along the axis, and which are respectively distal from and proximate to the front end. The coupled segment is adapted to be coupled with an input shaft of a gearbox. A tubular coupler is journalled on and is rotatable relative to the inner annular bearing wall about the axis. The tubular coupler includes a middle segment, a clutching segment, and second spline segment. The middle segment is surrounded by and is shiftable relative to the inner annular bearing wall along the axis. The clutching segment extends from the middle segment forwardly and outwardly of the front end, and includes outer and inner surrounding wall surfaces opposite to each other in radial directions relative to the axis. The inner surrounding wall surface has spline and non-spline regions opposite to each other along the axis, and is disposed to surround and is shiftable relative to the first spline segment between a coupled position, where the spline region is in a spline engagement with the first spline segment, and an uncoupled position, where the non-spline region faces towards the first spline segment in the radial directions, thereby disconnecting the clutching segment from the clutch shaft. The outer surrounding wall surface has a surrounding recess which extends in radial directions and inwardly towards the axis. The second spline segment extends from the middle segment rearwardly and outwardly of the rear end, and is adapted to be maintained in a spline engagement with an output shaft of an electric motor in the coupled and uncoupled positions. A shifter member includes shifting and actuated ends. The shifting end is disposed in the surrounding recess such that the tubular coupler is permitted to rotate relative to the inner annular bearing wall in the coupled and uncoupled positions, and such that the inner surrounding wall surface is shifted between the coupled and uncoupled position by moving the shifting end in an axial direction parallel to the axis. The actuated end is disposed to be externally operable to cause the shifting end to move in the axial direction.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
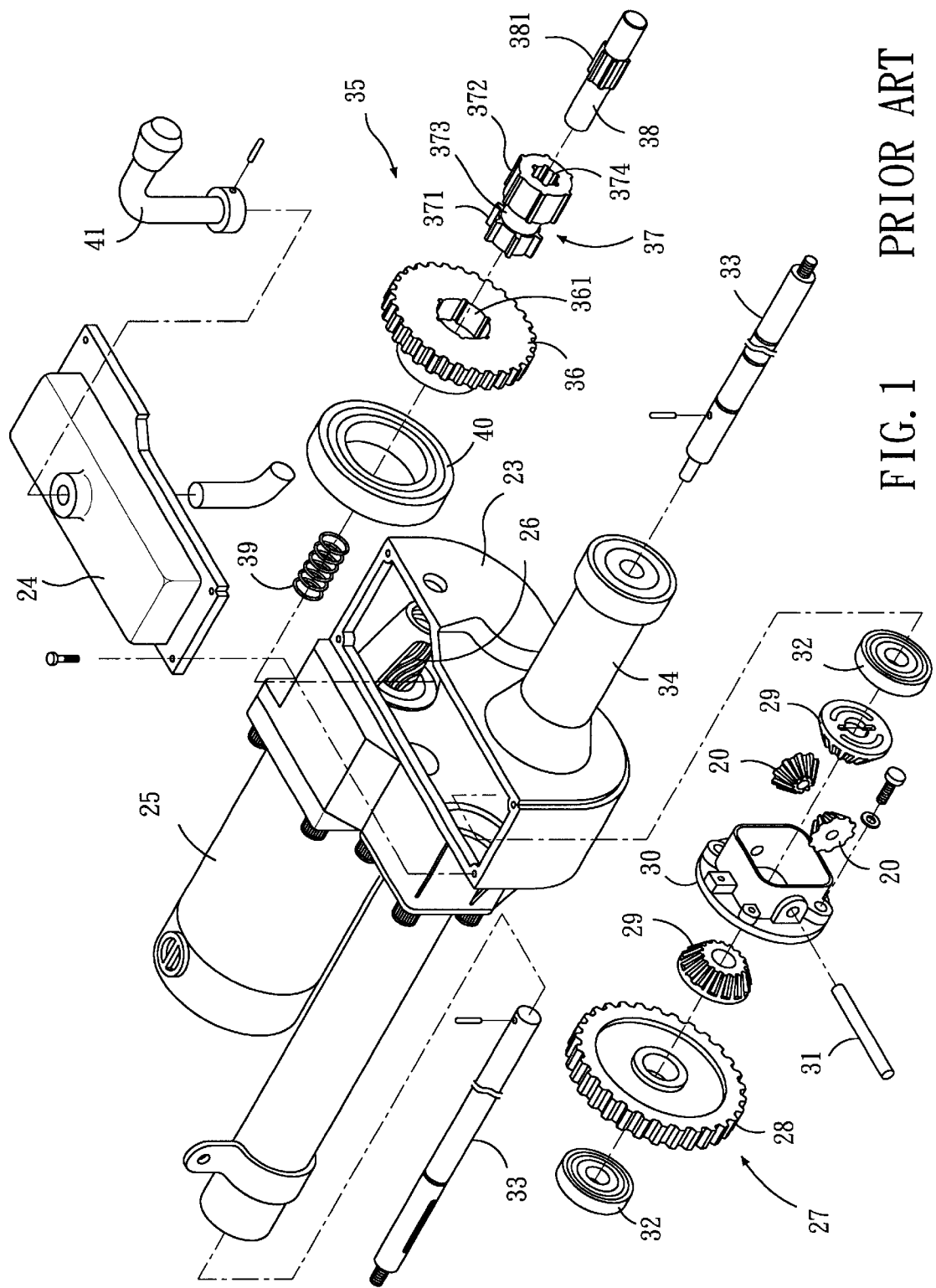
FIG. 1 is an exploded perspective view of a conventional clutch device of an electric motor-driven wheeled vehicle.
Figure 2:
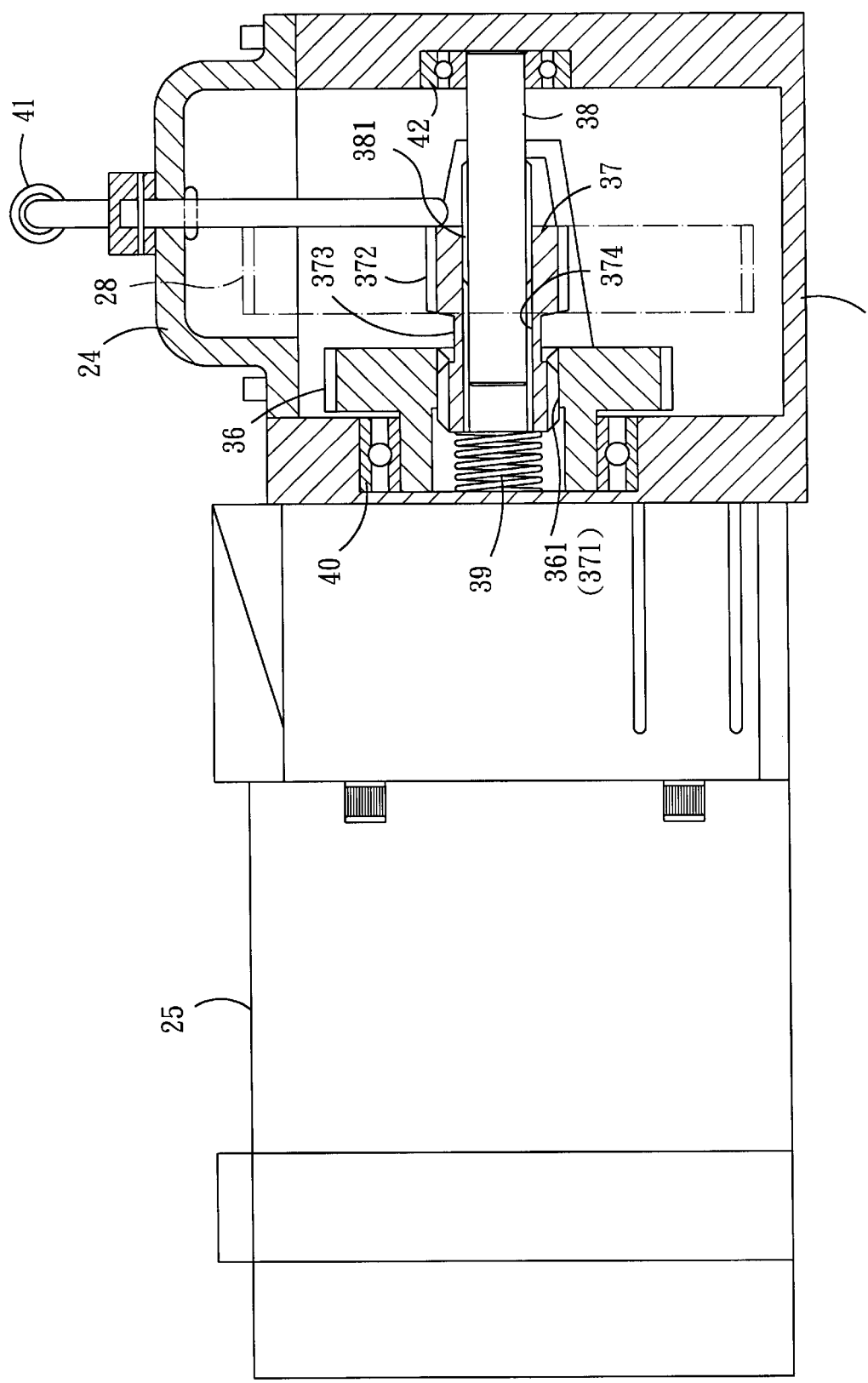
FIG. 2 is a sectional schematic view of the conventional clutch device in a coupled state.
Figure 3:
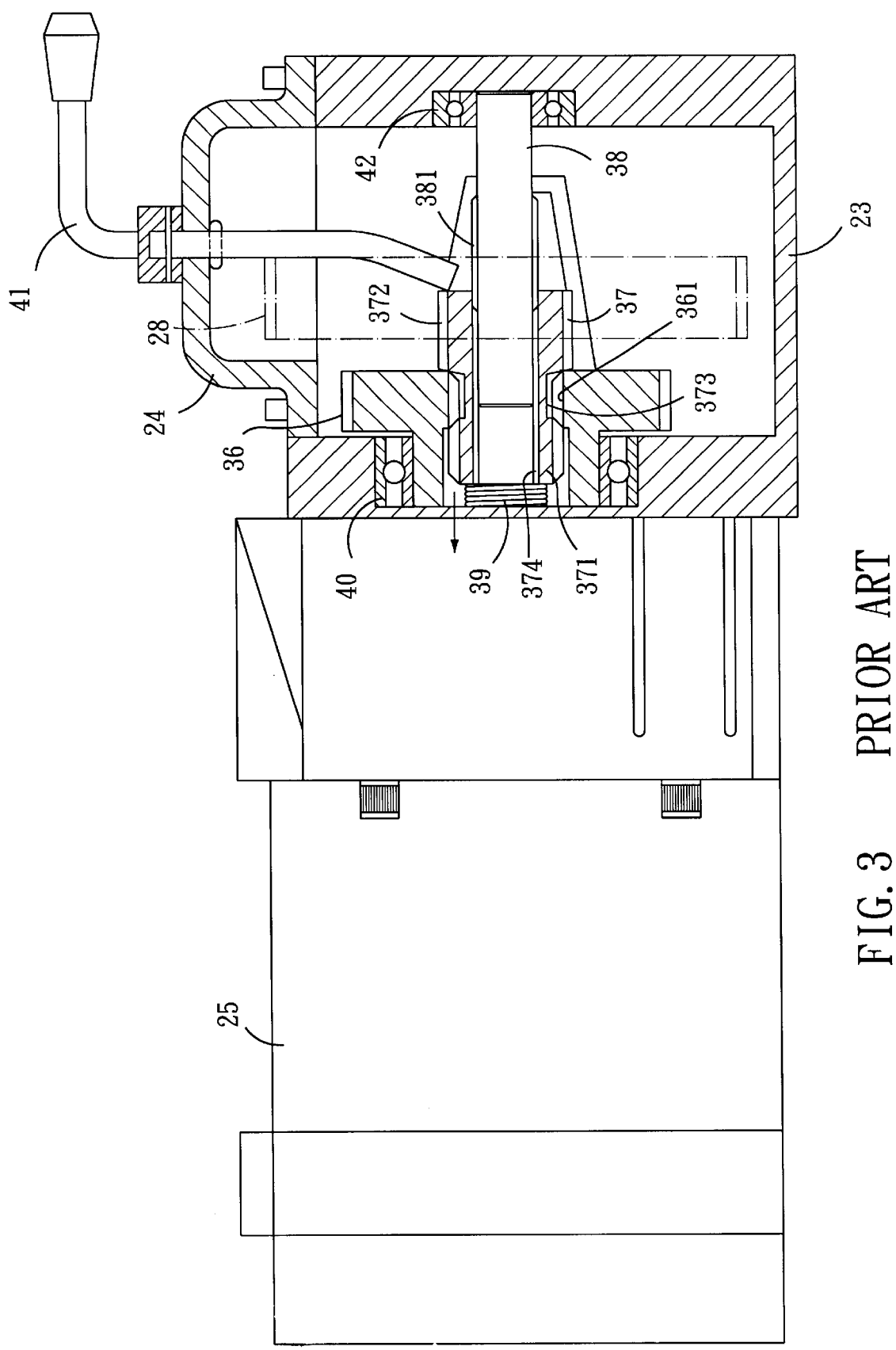
FIG. 3 is a sectional schematic view of the conventional clutch device in an uncoupled state.
Figure 4:
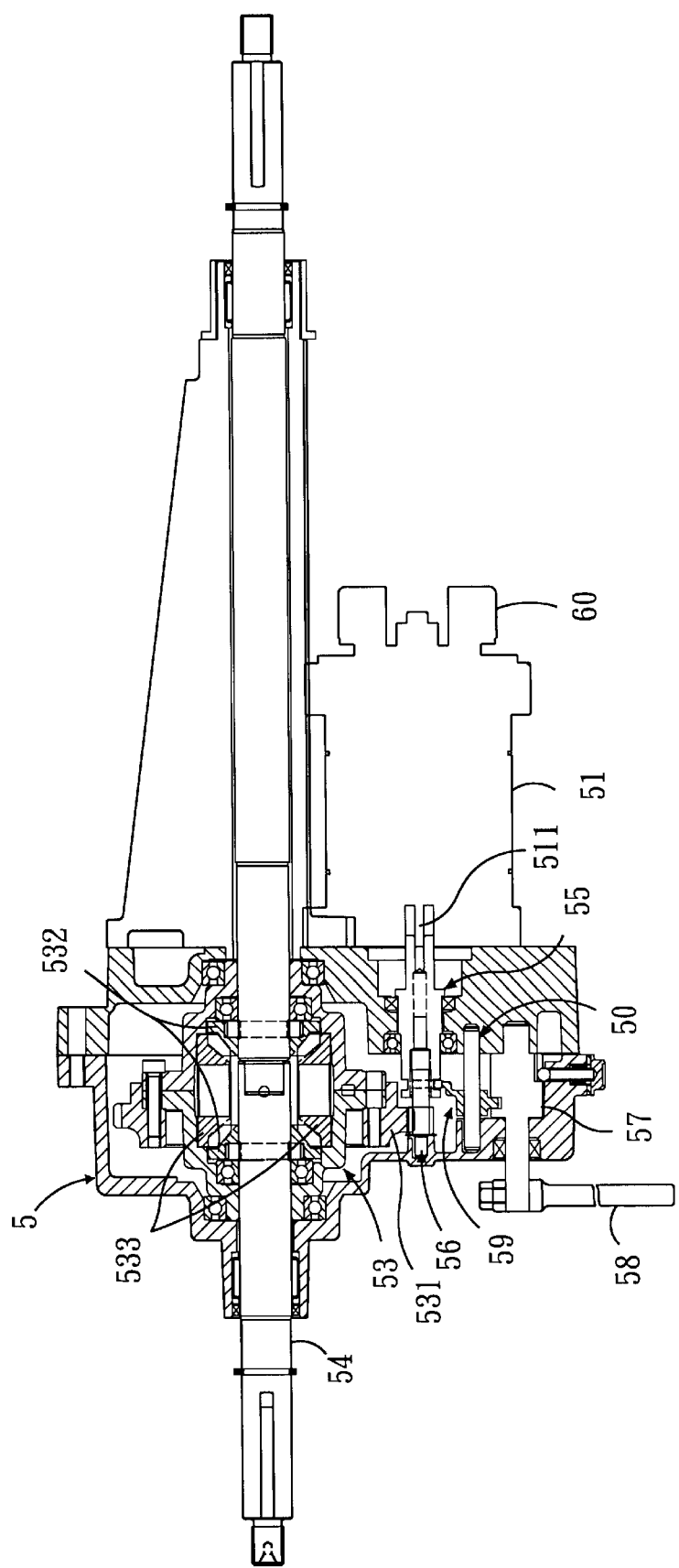
FIG. 4 is a sectional schematic view of a preferred embodiment of a clutch device according to this invention.

Referring to FIG. 4, the preferred embodiment of the clutch device for an electric motor-driven wheeled vehicle according to the present invention is shown to be mounted between an output shaft 511 of an electric motor 51 and an input shaft of a differential mechanism 53 in a gearbox 5 so as to transmit a drive delivered by the output shaft 511 to an input shaft 54 to rotate wheels (not shown) of the vehicle.

Figure 5:
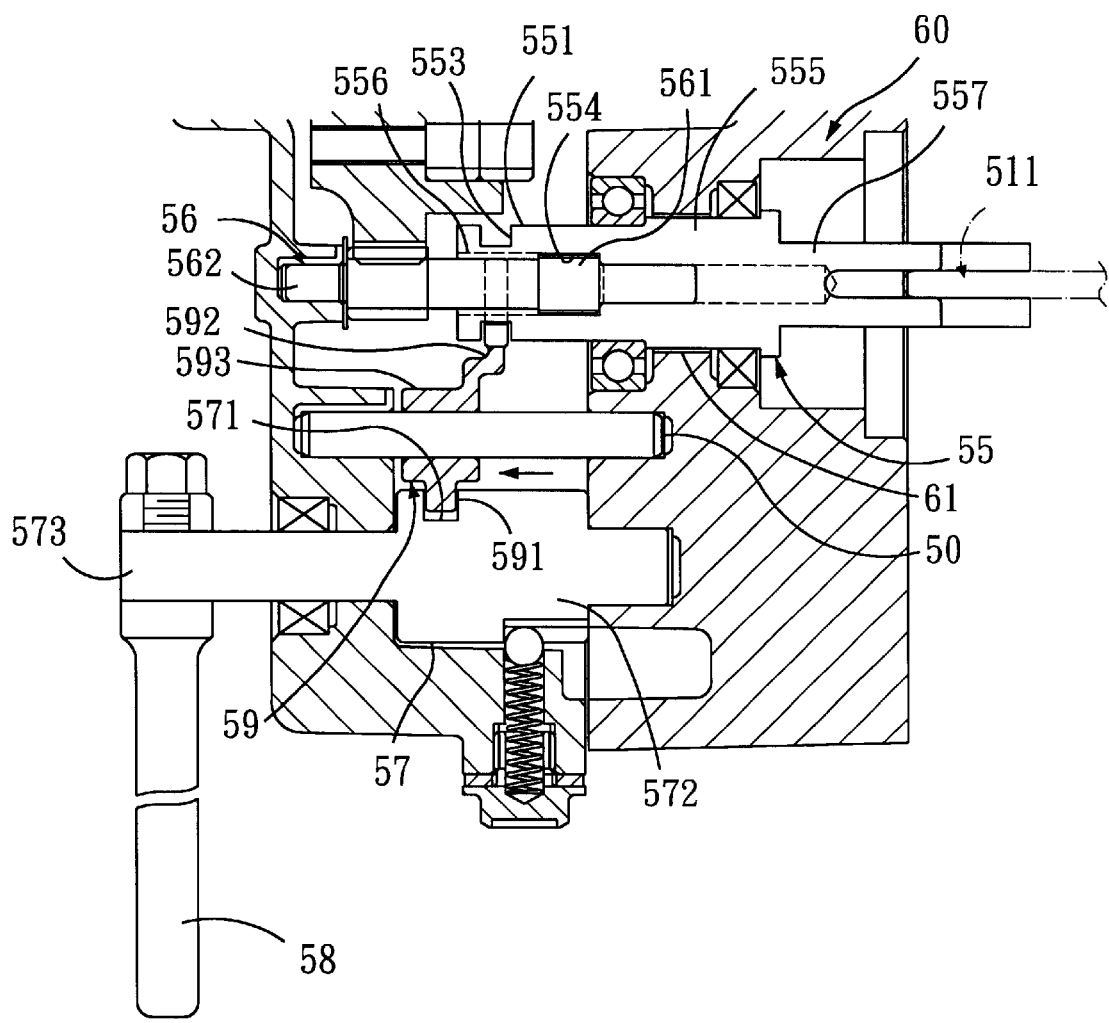
FIG. 5 is a sectional schematic view of the preferred embodiment in a coupled state.
Figure 6:
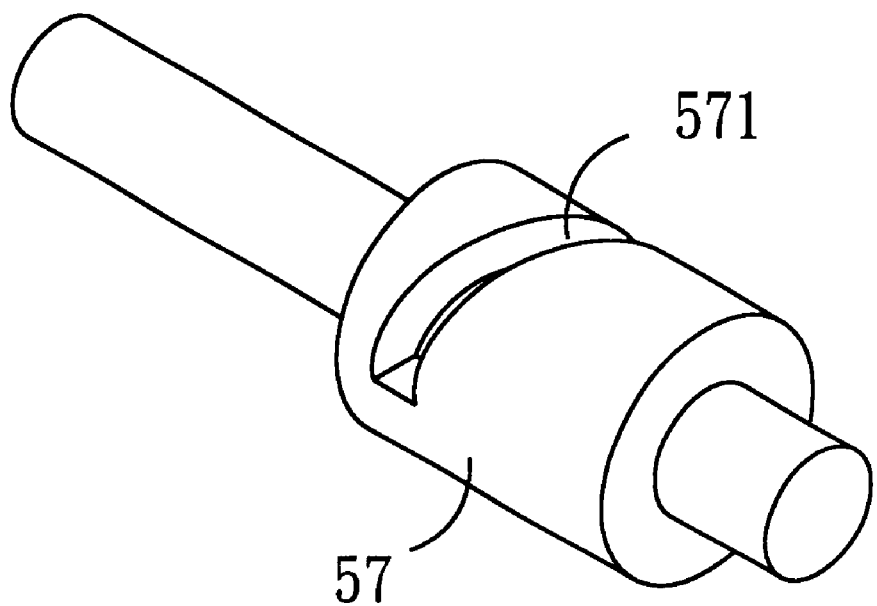
FIG. 6 is a perspective view of a force transmitting member of the preferred embodiment.

With reference to FIG. 5, in this embodiment, the clutch device is shown to comprise a mounting support 60, a clutch shaft 56, a tubular coupler 55, a shifter member 59, a guiding shaft 50, a force transmitting member 57, and an operating lever 58.

The mounting support 60 is mounted in the gearbox 5, and includes front and rear ends opposite to each other along a first axis of the output shaft 511, and an inner annular bearing wall 61 which surrounds the first axis and which extends between the front and rear ends.

The clutch shaft 56 includes a coupled segment 562 and a first spline segment 561 which are opposite to each other along the first axis, and which are disposed respectively distal from and proximate to the front end of the mounting support 60. The coupled segment 562 meshes with a primary gear 531 so as to actuate bevel wheels 532 and differential pinions 533 of the differential mechanism 53 to rotate the input shaft 54, as shown in FIG. 4.

Figure 7:
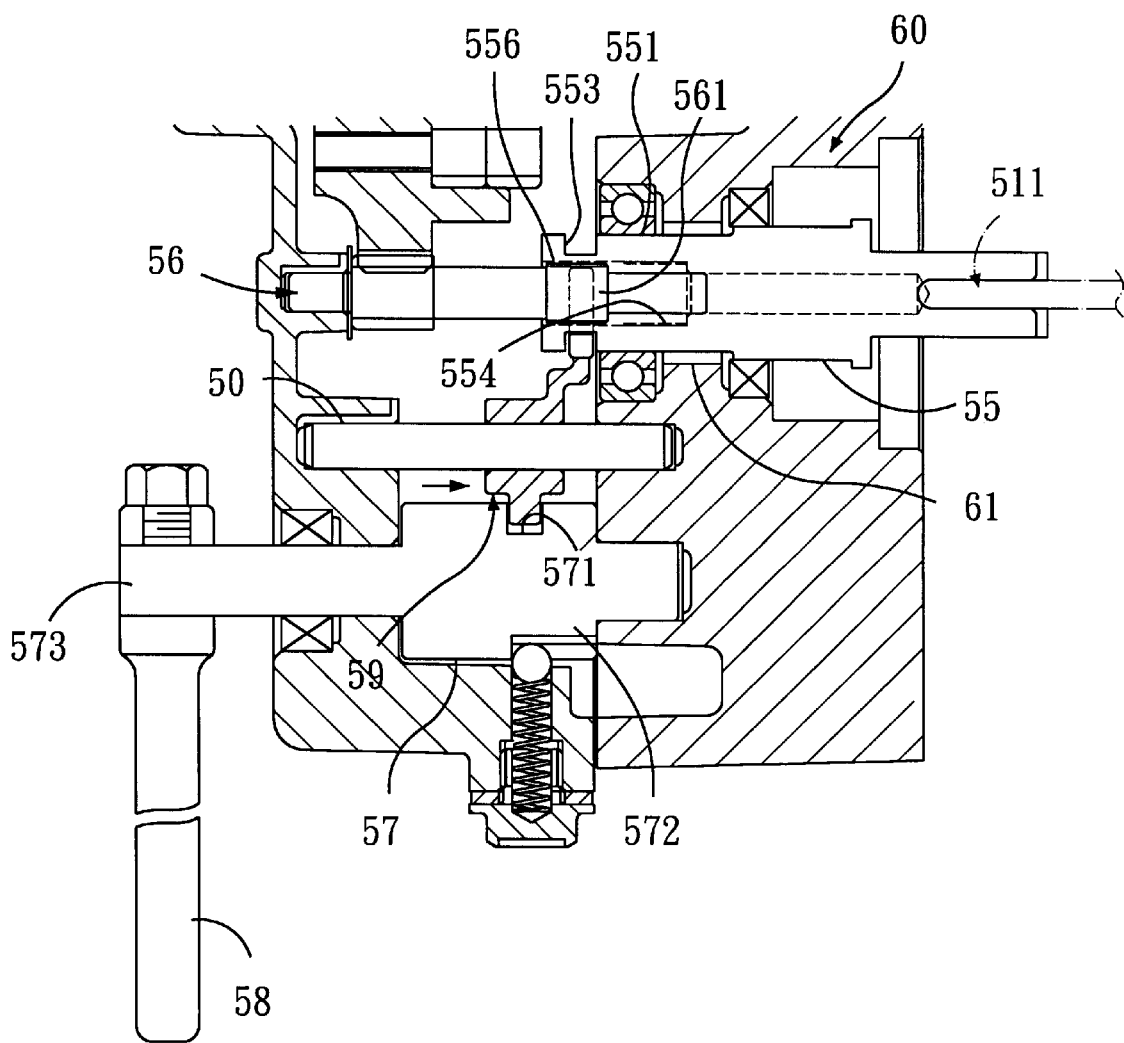
FIG. 7 is a sectional schematic view of the preferred embodiment in an uncoupled state.

The tubular coupler 55 is journalled on and is rotatable relative to the inner annular bearing wall 61 of the mounting support 60 about the first axis. The tubular coupler 55 includes a middle segment 555, a clutching segment 551, and a second spline segment 557. The middle segment 555 is surrounded by and is shiftable relative to the inner annular bearing wall 61 of the mounting support 60 along the first axis. The clutching segment 551 extends from the middle segment 555 forwardly and outwardly of the front end of the mounting support 60, and includes outer and inner surrounding wall surfaces opposite to each other in radial directions relative to the first axis. The inner surrounding wall surface has spline and non-spline regions 554,556 opposite to each other along the first axis, and is disposed to surround and to be shiftable relative to the first spline segment 561 between a coupled position, where the spline region 554 is in a spline engagement with the first spline segment 561 (as shown in FIG. 5), and an uncoupled position, where the non-spline region 556 faces towards the first spline segment 561 in the radial directions (as shown in FIG. 7), thereby disconnecting the clutching segment 551 from the clutch shaft 56. The outer surrounding wall surface of the clutching segment 551 has a surrounding recess 553 which extends in radial directions and inwardly towards the first axis. The second spline segment 557 extends from the middle segment 555 rearwardly and outwardly of the rear end of the mounting support 60, and is maintained in a spline engagement with the output shaft 511 of the motor 51 in both the coupled and uncoupled positions.

The shifter member 59 includes a shifting end 592, an actuated end 591, and a sleeve portion 593. The shifting end 592 is disposed in the surrounding recess 553 so as to permit the tubular coupler 55 to rotate relative to the inner annular bearing wall 61 of the mounting support 60 in both the coupled and uncoupled positions. In addition, by moving the shifting end 592 in an axial direction parallel to the first axis, the inner surrounding wall surface of the clutching segment 551 is shifted between the coupled and uncoupled position. The actuated end 591 is disposed radially opposite to the shifting end 592. The actuated end 591 is in the form of a cam follower, and is externally operable to cause the shifting end 592 to move in the axial direction. The sleeve portion 593 is disposed between the shifting and actuated ends 592,591.

The guiding shaft 50 is mounted to the mounting support 60, and extends in the axial direction such that the sleeve portion 593 is sleeved on the guiding shaft 50 and is guided to move in the axial direction.

The force transmitting member 57 is mounted to the mounting support 60 and is turnable about a second axis parallel to the first axis. The force transmitting member 57 includes a cam segment 572 which is formed with a groove 571 that extends spirally about the second axis, and a turnable segment 573 which is disposed opposite to the cam segment 572 in the axial direction and outwardly of the mounting frame 60 so as to engage the operating lever 58. The actuated end 591 of the shifter member 59, that is the cam follower, is disposed in the groove 571. As such, when the operating lever 58 is operated to turn the turnable segment 573 about the second axis, the cam follower 591 is moved in the axial direction along the groove 591 so as to shift the tubular coupler 55 between the coupled and uncoupled positions.

An electric solenoid brake 60 is disposed to arrest the rotational motion of the output shaft 511 of the motor 51 so as to immobilize the vehicle. Thus, when operation of the motor 51 is stopped to immobilize the vehicle, the electric solenoid brake 60 arrests the rotational motion of the output shaft 511. In this state, if the user desires to push the vehicle along, he only needs to operate the operating lever 58 to shift the tubular coupler 55 from the coupled position to the uncoupled position in the manner described above, thereby permitting movement of the vehicle in spite of the electric solenoid brake 60 that arrests the output shaft 511.

Preferably, the first spline segment 561 is tapered gradually at an end thereof to permit smooth movement of the inner surrounding wall surface of the clutching segment 551 relative to the first spline segment 561.

As illustrated, by virtue of the engagement between the cam segment 572 and the cam follower 591, which can transmit a rotational force of the operating lever 58 to drive the shifter member 59 to displace in the axial direction, and by virtue of the shifting end 592 of the shifter member 59 which is disposed in the surrounding recess 553 formed in the outer surrounding wall surface of the clutching segment 551, movement of the tubular coupler 55 relative to the clutch shaft 56 between the coupled and uncoupled positions can be smooth and steady even without the use of a biasing spring.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

We claim:

1. A clutch device for an electric motor-driven wheeled vehicle, the vehicle including an electric motor having an output shaft with a first axis for delivering a drive, and a gearbox having an input shaft disposed to be driven by the drive, said clutch device comprising:

a mounting support including front and rear ends opposite to each other along the first axis, and an inner annular bearing wall which surrounds the first axis and which extends between said front and rear ends;

a clutch shaft including a coupled segment and a first spline segment opposite to each other along the first axis, and disposed respectively distal from and proximate to said front end, said coupled segment being adapted to be coupled with the input shaft;

a tubular coupler journalled on and rotatable relative to said inner annular bearing wall about the first axis, said tubular coupler including a middle segment disposed to be surrounded by and shiftable relative to said inner annular bearing wall along the first axis, a clutching segment extending from said middle segment forwardly and outwardly of said front end of said mounting support, and including outer and inner surrounding wall surfaces opposite to each other in radial directions relative to the first axis, said inner surrounding wall surface having spline and non-spline regions opposite to each other along the first axis, and being disposed to surround and being shiftable relative to said first spline segment between a coupled position, where said spline region is in a spline engagement with said first spline segment, and an uncoupled position, where said non-spline region faces towards said first spline segment in the radial directions, thereby disconnecting said clutching segment from said clutch shaft, said outer surrounding wall surface having a surrounding recess which extends in radial directions and inwardly towards the first axis, and a second spline segment extending from said middle segment rearwardly and outwardly of said rear end of said mounting support, and adapted to be maintained in a spline engagement with the output shaft in the coupled and uncoupled positions; and a shifter member including a shifting end disposed in said surrounding recess such that said tubular coupler is permitted to rotate relative to said inner annular bearing wall in both the coupled and uncoupled positions, and such that said inner surrounding wall surface is shifted between said coupled and uncoupled positions by moving said shifting end in an axial direction parallel to the first axis, and an actuated end disposed to be externally operable to cause said shifting end to move in the axial direction.

2. The clutch device of claim 1, wherein said shifter member includes a sleeve portion disposed between said shifting end and said actuated end, said clutch device further comprising a guiding shaft disposed to be oriented in the axial direction and to be sleeved over by said sleeve portion so as to guide said shifter member to move in the axial direction.

3. The clutch device of claim 2, further comprising a force transmitting member which includes a cam segment, and a turnable segment which is opposite to said cam segment in the axial direction and which is mounted to be rotated about a second axis parallel to the first axis so as to turn said cam segment about the second axis, said actuated end being in form of a cam follower disposed to couple with said cam segment such that when said turnable segment is turned about the second axis, said cam follower is moved in the axial direction.

4. The clutch device of claim 3, further comprising an operating lever disposed to turn said turnable segment about the second axis.

\* \* \* \* \*